United States Patent [19]
Patterson

[11] 3,950,005
[45] Apr. 13, 1976

[54] BRAKE APPARATUS FOR A MANUALLY PROPELLED MATERIAL HANDLING VEHICLE

[76] Inventor: Wayne C. Patterson, No. 3 Watson St., Rome, Ga. 30161

[22] Filed: Jan. 28, 1975

[21] Appl. No.: 544,700

[52] U.S. Cl. ............... 280/47.31; 188/29; 188/134
[51] Int. Cl.² ........................................... B62B 1/18
[58] Field of Search ............ 280/47.31; 188/21, 22, 188/29, 134; 74/489, 527; 180/19 H; 403/349

[56] References Cited
UNITED STATES PATENTS

| | | | |
|---|---|---|---|
| 135,889 | 2/1973 | Collingbourne | 188/22 |
| 2,138,239 | 11/1938 | Irgens | 180/19 H |
| 2,716,031 | 8/1955 | Roessler | 280/47.31 |
| 2,905,482 | 9/1959 | Ruttger | 188/22 |

*Primary Examiner*—M. H. Wood, Jr.
*Assistant Examiner*—John A. Pekar

[57] ABSTRACT

A manually propelled material handling vehicle comprising a vehicle frame, at least one wheel carried by and supporting the frame, and an elongate, rearwardly extending handle bar carried by the frame remote from the wheel and adapted to be gripped by an operator in propelling and guiding the vehicle. Brake means are provided and are responsive to operator resistance to the natural tendency of the vehicle to increase speed and move away from the operator on a decline for controlling the speed of the vehicle in such manner that the operator may maintain the vehicle under control at all times. The brake means comprises a brake operatively associated with the wheel for applying a braking force thereto and actuating means operatively associated with the handle bar. The actuating means is responsive to operator resistance to an increase of speed of the vehicle on a decline for controlling the application of braking force to the wheel. The tendency of the vehicle to increase the speed and move away from the operator on a decline is thereby resisted to allow the operator to maintain control of the vehicle at all times.

3 Claims, 6 Drawing Figures

U.S. Patent  April 13, 1976  3,950,005
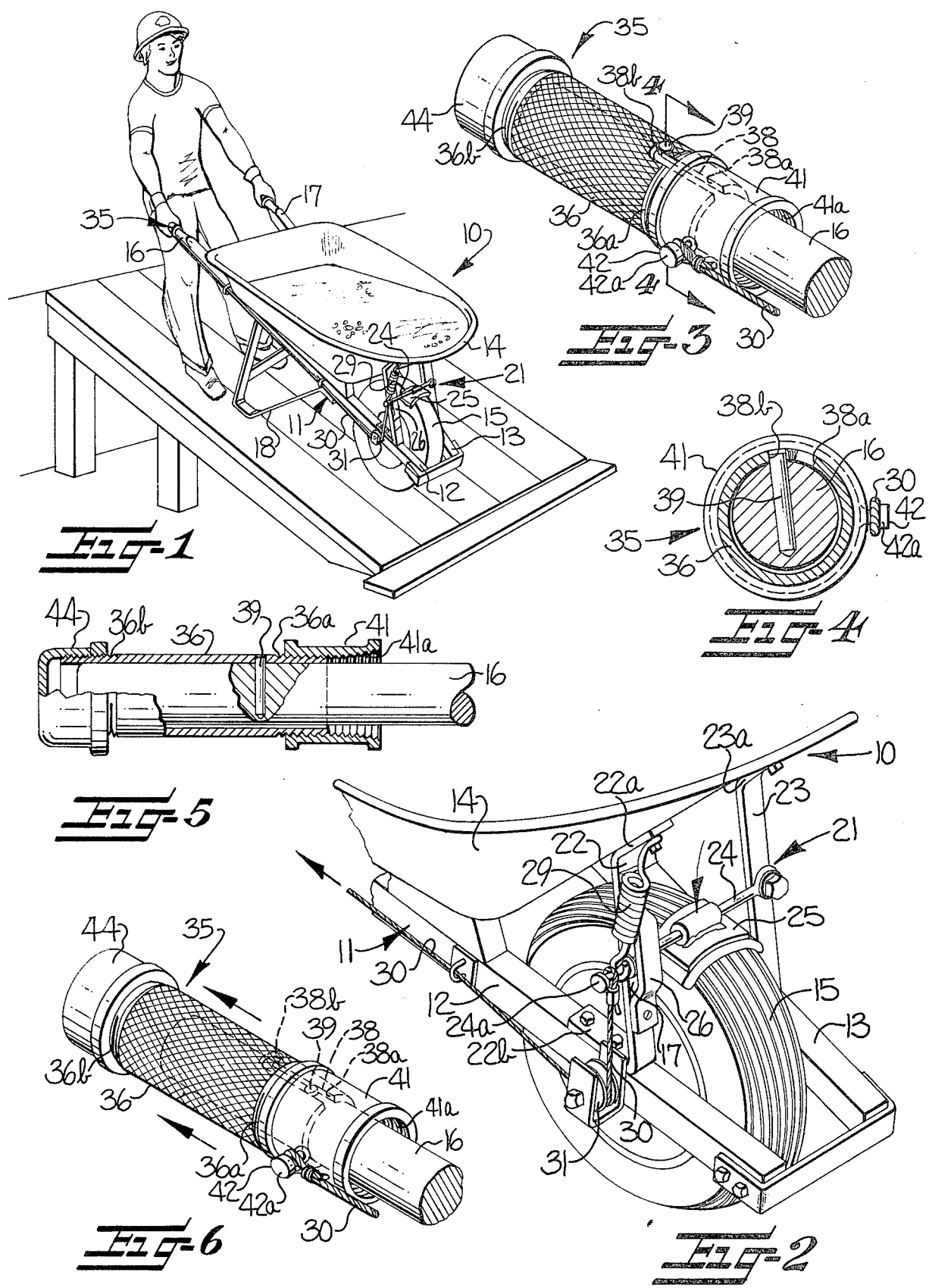

BRAKE APPARATUS FOR A MANUALLY PROPELLED MATERIAL HANDLING VEHICLE

BACKGROUND OF THE INVENTION

This invention relates to a manually propelled material handling vehicle, such as a wheelbarrow, hand truck, or the like, having braking means for permitting the operator to control the speed of the vehicle on a decline while maintaining a firm grip on the handle bar of the vehicle to guide the vehicle. The specific disclosure herein is that of a wheelbarrow, but the invention hereof is not limited to a particular type of material handling vehicle.

Wheelbarrows are universally utilized in the construction industry for transporting building materials, such as bricks, sand, and mortar from one place to another on a construction site. A wheelbarrow load of the above mentioned materials may weigh several hundred pounds, yet the operator must often push a fully loaded wheelbarrow under his own power up inclines, such as walkways, leading from one construction level to another.

Even more difficult is the task of handling a loaded wheelbarrow on a decline. Not only does an operator have to guide the wheelbarrow, but because of the inertia generated from the downward movement of the heavy load, the operator must actually exert pull opposite the direction of movement to prevent the wheelbarrow from moving too fast. In some instances the load may be too heavy to be controlled in the above manner. As a result, the operator may lose control of the wheelbarrow, whereupon it continues down the decline out of control, risking damage to property and injury to others nearby.

In an effort to solve the aforementioned problems, brakes have been proposed for wheelbarrows or other material handling vehicles to permit the operator to more easily control the speed thereof on a decline. However, all such previously proposed brake mechanisms have been inadequate and have presented problems in guiding or controlling the vehicle while operating the brake mechanism.

For example, U.S. Pat. No. 2,716,031, issued Aug. 23, 1955, discloses a hand brake for a wheelbarrow which includes a brake lever similar to those used on bicycles secured to one of the handle bars of a wheelbarrow adjacent the hand grip and extending below the hand grip in vertically spaced relation thereto. In order to engage the brake and slow the wheelbarrow, the operator must release his grip with one hand and reach downwardly to grasp and pull the brake lever upwardly toward the hand grip with his fingers.

In doing this he is unable to maintain a firm grip with that hand. He therefore risks losing control of the wheelbarrow, either by being unable to balance the wheelbarrow properly, or by the wheelbarrow pulling away from his loosened grip. Thus, while the brake disclosed in the above cited patent enables the operator to control the speed of the wheelbarrow, the method in which the brake is activated does not permit the operator to maintain control in guiding and balancing it.

SUMMARY OF THE INVENTION

Accordingly, it is the object of this invention to provide a manually propelled material handling vehicle having brake means responsive to operator resistance to the natural tendency of the vehicle to increase speed and move away from the operator on a decline for controlling the speed of the vehicle in such manner that the operator may maintain the vehicle under control at all times.

This and other objects and advantages of the present invention are achieved in the preferred embodiment set forth herein by providing a manually propelled material handling vehicle comprising a vehicle frame, at least one wheel carried by and supporting the frame, and an elongate rearwardly extending handle bar carried by the frame remote from the wheel and adapted to be gripped by an operator in propelling and guiding the vehicle. Braking means are provided for permitting the operator to control the speed of the vehicle on a decline while maintaining a firm grip on the handle bar to guide the vehicle. The braking means comprise a brake cooperatively associated with the wheel for applying a braking force thereto. Actuating means is operatively associated with the handle bar and is responsive to operator resistance to an increase of speed of the vehicle on a decline for controlling the application of braking force to the wheel.

Preferably, a hand grip is slidably mounted on the handle bar for rearward movement relative to the handle bar by operator resistance to an increase of speed of the vehicle on a decline. Means are provided for interconnecting the brake and the slidable hand grip for controlling actuation of the brake in response to the rearward movement of the hand grip.

Also according to the preferred embodiment the hand grip comprises a tubular, substantially cylindrical member slidably mounted on the handle bar coaxially therewith and having an outside circumference suitable for being substantially encircled by the hand of the operator.

The preferred embodiment of the invention also includes means for locking the hand grip in a forward position on the handle bar so that the brake is out of cooperation with the wheel in order that the wheelbarrow may be pulled rearwardly by the operator when desired.

BRIEF DESCRIPTION OF THE DRAWINGS

Some of the objects of the invention having been set forth above, other objects and advantages will appear as the description of the invention proceeds, when taken in conjunction with the following drawings in which:

FIG. 1 is a perspective view of a wheelbarrow according to this invention as typically used on a construction site and particularly showing how the operator pulls backwardly on the wheelbarrow to control its speed on a decline;

FIG. 2 is an enlarged fragmentary perspective view of the front portion of the wheelbarrow shown in FIG. 1, and showing details of the brake;

FIG. 3 is an enlarged fragmentary perspective view of the hand grip according to this invention in forward, locked position for maintaining the brake out of engagement with the wheel;

FIG. 4 is an enlarged cross-sectional view taken substantially along line 4—4 of FIG. 3 showing the means for locking the brake out of engagement with the wheel;

FIG. 5 is an enlarged elevational view, with parts in cross-section of the hand grip as shown in FIG. 3; and FIG. 6 is an enlarged fragmentary perspective view of the hand grip according to this invention in rearward position for actuating the brake.

DESCRIPTION OF THE PREFERRED EMBODIMENT

Referring now to the drawings, a manually propelled material handling vehicle according to the present invention is shown in FIG. 1 and broadly indicated at 10. This particular disclosure is that of a wheelbarrow.

The wheelbarrow shown is of a known type and comprises generally a wheelbarrow frame 11. The frame 11 comprises a pair of laterally spaced apart, diverging, elongate frame members 12 and 13. A wheelbarrow body 14 for carrying a load of material is secured to the upper surface of the frame members 12 and 13 adjacent their diverging ends. A wheel 15 is rotatably mounted intermediate the frame members 12 and 13 adjacent the converging end thereof. A pair of rearwardly extending, laterally spaced apart, diverging, elongate handle bars 16 and 17 are carried by the frame 11 remote from the wheel 15 and have free ends for being gripped by the operator in propelling and guiding the wheelbarrow. The handle bars 16 and 17, may be secured to the frame 11, or may be integrally formed therewith, as is shown in FIG. 1. The wheelbarrow is supported when at rest by a pair of legs 18 secured to the underside of frame members 12 and 13 respectively, beneath the body 14.

In accordance with this invention the above described wheelbarrow is provided with braking means for permitting the operator to control the speed of the wheelbarrow on a decline while maintaining a firm grip on the handle bars 16 and 17 to guide and balance the wheelbarrow. The braking means comprises a brake 21 carried by the frame 11 for progressive frictional braking contact with the wheel 15. As will be observed from FIG. 2, a pair of elongate metal brake support brackets 22, 23 are positioned in laterally opposed relation adjacent the wheel 15 and secured, as by bolting, by their respective opposing ends 22a, 23a, 22b, 23b to the front surface of the body 14 and the upper surface of the frame members 12 and 13 adjacent the wheel 15, respectively.

An elongate brake shoe arm 24 is pivotally connected on one end thereof by a bolt to the brake support bracket 23 and extends transversely over the top peripheral surface of the wheel 15 for substantially vertical up-and-down movement relative thereto. The opposite, free end of the brake shoe arm 24 extends across the front surface of the bracket 22 and extends outwardly therefrom away from the wheel 15 and has an enlarged head 24a thereon, the purpose of which will be detailed hereinafter.

A brake shoe 25 is secured to the brake shoe arm 24 in axial alignment with the wheel 15 for frictional contact with the outer peripheral surface of the wheel. As is best shown in FIG. 2, the brake shoe 25 has a rounded, concave lower surface for substantially matingly engaging the rounded tread of the wheel 15. Preferably, the brake shoe is constructed of laminated leather-belting or thick fabric conveyor belting material.

As will also be seen in FIG. 2, as the brake shoe arm 24 moves up and down about its pivot, the brake shoe 25 likewise moves up and down out of and into frictional braking contact with the wheel 15. To limit the up-and-down movement of the brake shoe arm 24 and to maintain it in proper transverse contacting alignment with the tread of the wheel 15, a U-shaped member 26 is fixedly secured, as by bolting, to the forwardly facing surface of the brake support bracket 22 and defines a void 17 therebetween through which the brake shoe arm 24 extends.

Preferably, the brake shoe 25 is normally urged out of contact with the wheel 15. To accomplish this, a coil spring 29 is provided, having one end secured to the upper end 22a of the brake support bracket 22 and the other end secured to the brake shoe arm 24 intermediate the enlarged end 24a thereof and the brake support bracket 22. The enlarged head 24a prevents the spring from sliding off the brake shoe arm 24. Thus the coil spring 29 normally urges the brake shoe 25 upwardly out of frictional engagement with the wheel 15.

The brake 21, as described above, is operably connected to a flexible cable 30, preferably formed of a non-corrosive metal. One end of the cable 30 is secured to the free end of the brake shoe arm 24 intermediate the enlarged head 14a thereof and the brake support bracket 22. A pulley 31 is rotatably mounted on the outer side edge of the frame member 12 adjacent the wheel 15 and substantially beneath the enlarged head 24a of the brake shoe arm 24. The cable 30 passes around the pulley 31 and extends along the frame member 12 and the integrally formed handle bar 16 substantially to the free end thereof and is secured to an actuating member comprising a hand grip 35.

The hand grip 35 comprises a tubular, substantially cylindrical hand receiving member 36, preferably a short length of metal pipe slidably mounted on the handle bar 16 adjacent the free end thereof. As is shown in FIG. 3, the outer peripheral surface of the hand receiving member 36 is knurled to aid the operator in firmly gripping it with his hand.

The hand receiving member 36 includes means for locking the hand grip 35 in a forward position on the handle bar 16. In this forward position the brake shoe 25 is out of frictional engagement with the wheel 15, as will be described in greater detail hereinafter. The locking means comprise an elongate bayonet slot 38 formed in the hand receiving member and communicating with the forward edge thereof. As is best shown in FIGS. 3 and 6, the slot has a straight portion 38a in substantial axial alignment with the hand receiving member 36 and an innermost curved portion 38b at substantially right angles to the straight portion 38a. Embedded in the handle bar 16 and protruding slightly above the surface thereof and slidably positioned within the slot 38 is a pin 39, as is shown in FIG. 5.

As the hand receiving member 36 slides along the handle bar 16 the pin 39 rides in the straight slot portion 38a and prevents the hand receiving member 36 from twisting. To lock the hand receiving member 36 in the forward position, the hand receiving member 36 is pushed forward until the pin 39 is positioned at the innermost extent of the slot portion 38a, and then twisted clockwise, thereby positioning the pin 39 in the curved slot portion 38b, thereby preventing rearward movement of the hand receiving member 36.

As is best shown in FIG. 5, the forward and rearward opposing ends of the outer peripheral surface of the hand receiving member 36 have screw threads 36a, 36b respectively thereon. A pin shield 41, comprising a short length of tubular pipe of a larger internal diameter than the hand receiving member 36 and having mating screw threads 41a on the inner walls thereof is positioned on the handle bar 16 in advance of the hand receiving member 36 and is screwed onto the forward threaded end 36a of the hand receiving member 36 so that the pin shield 41 covers most of the bayonet slot 38 and thus protects the operator's hand from being pinched between the pin 39 and the walls of the bayonet slot 38. As is apparent, the pin shield 41 is securely interconnected with the hand receiving member 36 and slides on the handle bar 16 is unison with the hand receiving member 36.

As set forth above, the cable 30 is secured to the hand grip 35. This securement is accomplished by providing a bolt 42, having an enlarged head 42a, secured to and protruding radially from the peripheral surface of the pin shield 41. The cable 30 is looped around the bolt 42 intermediate the enlarged head 42a and the surface of the pin shield 41 and clamped, thus securing the cable to the hand grip 35.

A threaded cap 44 is secured to the rearward threaded end 36b of the hand receiving member 36 adjacent the free end of the handle bar 16 and encloses the end of the hand receiving member 36 in order to aid in limiting the forward movement of the hand grip 35 on the handle bar 16.

As an operator guides and balances the wheelbarrow 10 on a decline, he pulls rearwardly to counteract the inertia which tends to increase the speed of the wheelbarrow. The rearward pull of the operator causes the hand grip 35 to slide rearwardly on the handle bar 16. This rearwardly movement is transmitted by the cable 30 to the braking means. The pulley 31 changes the direction of pull of the cable 30 such that the cable pulls the brake shoe arm 24 downwardly against the upward pull of the spring 29, causing the brake shoe 25 to frictionally engage the periphery of the wheel 15. The steeper the decline or the greater the load in the wheelbarrow body 14, the greater the counteracting pull of the operator on the hand grip 35. Thus, the force of the frictional engagement of the brake shoe 25 with the wheel 15 is directly proportional to the effort the operator naturally exerts to slow the wheelbarrow. When the wheelbarrow reaches level ground, the operator then must resume pushing it. This pushing action slides the hand grip 35 forward on the handle bar 16. The spring 29 takes up the slack in the cable 30 caused by the forward movement of the hand grip 35 and urges the brake shoe arm 24 upwardly, thereby automatically disengaging the brake shoe 25 from frictional contact with the wheel 15.

Ocassionally the operator may wish to pull the wheelbarrow backward instead of pushing it forward, as after having emptied the load of materials from the wheelbarrow. To prevent the hand grip 35 from sliding rearwardly, thereby engaging the brake 25 in frictional contact with the wheel 15, the operator may lock the hand grip 35 in its forward position on the handle bar 16 by sliding the hand grip forward and twisting it slightly to position the pin 39 in the curved portion 38b of the bayonet slot 38, as is shown in FIG. 3, and as described above.

It is important to keep cable 30 relatively taut at all times in order to insure that it efficiently transmits all forward or rearward movement of the hand grip 35 to the brake shoe arm 24. This can be easily accomplished initially when opposing ends of the cable 30 are clamped around the brake shoe arm 24 and the bolt 42 on the pin shield 41. However, wear or temperature changes may increase or decrease the amount of tension on the cable 30. This can be easily corrected by screwing the pin shield 41 either outwardly or inwardly relative to the hand receiving member 36.

In the drawings and specifications there has been set forth a preferred embodiment of this invention, and although specific terms are employed, they are used in a generic and descriptive sense only and not for purposes of limitation, the invention being defined by the claims.

That which is claimed is:

1. A manually propelled material handling vehicle comprising frame means for supporting a load of material and having a pair of elongate rearwardly extending handle members for manipulation by an operator propelling and guiding the vehicle, a single wheel mounted from said frame means adjacent the forward extremity thereof for supporting said frame means, brake shoe means mounted from said frame means for movement adjacent said wheel means for selectively engaging said wheel means and applying thereto force resisting rotation thereof, spring means mounted from said frame means for normally exerting force biasing said brake shoe means away from engagement with said wheel means so as to normally allow said wheel means and the vehicle to roll freely, hand grip means slidably mounted on one of said handle members for manual gripping thereof by an operator propelling and guiding the vehicle and for rearward movement away from said wheel means in response to force exerted by an operator resisting any tendency of the vehicle to increase speed and move away from the operator, and elongate flexible cable means operatively connecting said hand grip means and said brake shoe means for transmitting to said brake shoe means force exerted by an operator resisting increasing vehicle speed so as to overcome said spring means biasing force and move said brake shoe means into braking engagement with said wheel means thereby facilitating control over the vehicle by the operator.

2. A manually propelled material handling vehicle according to claim 1 including means for locking said hand grip means in a forward position on said one handle member to prevent rearward movement thereof so that said brake shoe is maintained out of braking engagement with said wheel in order that the vehicle may be pulled rearwardly by the operator.

3. A manually propelled material handling vehicle according to claim 2, wherein said means for locking said hand grip means comprises a substantially arcuate right angle bayonet slot in said hand grip means adjacent to and communicating with the forward axial edge thereof, and a pin secured to said one handle member for being matingly received in said bayonet slot by sliding said hand grip means forwardly and twisting said hand grip means to securely position said pin in said bayonet slot.

* * * * *